United States Patent
Lee

(10) Patent No.: US 6,672,603 B2
(45) Date of Patent: Jan. 6, 2004

(54) SUSPENSION LAYOUT USING STEERING GEAR FRAME

(75) Inventor: Unkoo Lee, Kyungki-do (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 10/192,556

(22) Filed: Jul. 9, 2002

(65) Prior Publication Data
US 2003/0047896 A1 Mar. 13, 2003

(30) Foreign Application Priority Data
Sep. 11, 2001 (KR) .................................. 2001-0055895

(51) Int. Cl.$^7$ ........................... B62D 21/11; B62D 21/00
(52) U.S. Cl. ............................. 280/124.109; 280/781; 180/311
(58) Field of Search .................... 280/124.109, 781, 280/93.502; 180/311

(56) References Cited

U.S. PATENT DOCUMENTS

| | | | | | |
|---|---|---|---|---|---|
| 4,817,973 | A | * | 4/1989 | Takeda | 280/781 |
| 5,005,849 | A | * | 4/1991 | Gandiglio et al. | 280/124.109 |
| 5,887,896 | A | * | 3/1999 | Kobayashi et al. | 280/781 |
| 6,390,224 | B1 | * | 5/2002 | Yoshida | 180/312 |
| 6,398,262 | B1 | * | 6/2002 | Ziech et al. | 280/785 |

* cited by examiner

Primary Examiner—Michael J. Carone
Assistant Examiner—M. Thomson
(74) Attorney, Agent, or Firm—Pennie & Edmonds LLP

(57) ABSTRACT

The present invention provides a suspension layout using a steering gear frame, in which a steering apparatus assembly and a sub-frame are combined in a single structure. The sub-frame includes a plurality of side members, which are provided along the longitudinal direction of the vehicle frame and at a predetermined distance from each other. A cross member extends in the direction of the width of the vehicle and fixedly connects the side members. The steering apparatus assembly includes steering gear motors that are provided for each side member and cooperate through steering transmitting assemblies to rotate steering knuckles.

10 Claims, 4 Drawing Sheets

US 6,672,603 B2

SUSPENSION LAYOUT USING STEERING GEAR FRAME

FIELD OF THE INVENTION

The present invention relates to a suspension layout using a steering gear frame, and more particularly, to a suspension layout using a steering gear frame in which an assembly for an independent power steering system is integrated into a single structure.

BACKGROUND OF THE INVENTION

A sub-frame for a vehicle is typically mounted in a lower portion of the engine compartment; that is, to a lower front area of the vehicle frame along the width direction of the vehicle. The sub-frame interconnects the suspension system and the vehicle frame. The sub-frame also supports a steering gear box assembly.

Since the sub-frame determines the overall strength of the vehicle frame to a great extent, it is necessary that the sub-frame possess a strength of at least a predetermined amount. Also, the sub-frame must be able to securely support structural elements of the suspension system that are connected to the sub-frame on opposite ends thereof.

Conventional sub-frames are typically made by bolting or welding together press-formed plates to provide a closed cross-section member. Separate brackets are bolted or welded on to secure a steering box assembly along the sub-frame member. However, the conventional sub-frame presents drawbacks in size and weight when made of sufficient strength. Also, the overall time required for manufacture is unnecessarily increased with the mounting of the steering gear box assembly to the sub-frame in a separate process. Finally, the large number of parts needed for the steering gear box assembly increases overall manufacturing costs and makes for a complicated structure in the area where the steering gear box assembly is provided.

SUMMARY OF THE INVENTION

In one preferred embodiment, the present invention provides a suspension layout using a steering gear frame comprising a sub-frame and steering apparatus assembly. The sub-frame includes a plurality of side members, which are provided in a longitudinal direction of a vehicle frame and at a predetermined distance from each other in a direction along a width of the vehicle. The sub-frame also includes a cross member extending in a direction along the width of the vehicle and fixedly connected to the side members. The steering apparatus assembly includes steering gear motors that are provided on each side member and operate such that the steering rods undergo rectilinear motion. A steering transmitting assembly cooperates with the rods to convert the rectilinear motion of the rods to rotational motion of knuckles.

In an alternative embodiment, a vehicle suspension layout comprises first and second side frame members with a cross member extending between and rigidly securing together the side frame members. The side members and cross member together form at least a part of a sub-frame. First and second steering gear motors are disposed each on one side member in a lengthwise direction thereof. First and second steering assemblies disposed on the sub-frame, one each cooperating with one steering gear motor to transmit steering forces independently to knuckles associated with vehicle wheels. Preferably, the steering gear motors are disposed in indentations formed in the side members. Also, the steering assemblies may comprise a link element hingedly connected to a tie rod with the link element pivotably mounted on the cross member. The link member is hingedly connected to a rod of the steering gear opposite the tie rod, and the tie rod is configured for connection to the knuckle opposite the link member.

BRIEF DESCRIPTION OF THE DRAWINGS

The accompanying drawings, which are incorporated in and constitute a part of the specification, illustrate an embodiment of the invention, and, together with the description, serve to explain the principles of the invention.

DETAILED DESCRIPTION OF THE PREFERRED EMBODIMENTS

Preferred embodiments of the present invention will now be described in detail with reference to the accompanying drawings.

Figure 1:
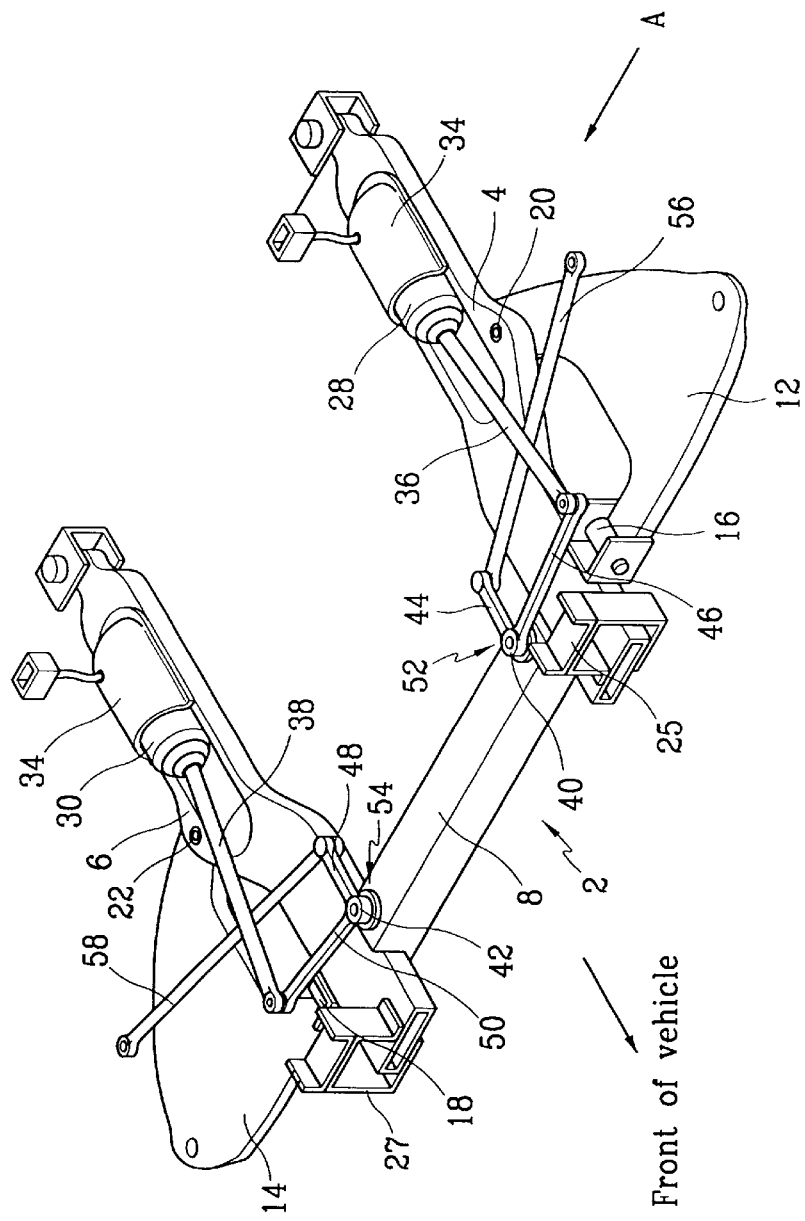
FIG. 1 is a perspective view of a suspension layout using a steering gear frame according to a preferred embodiment of the present invention.

As shown in FIG. 1, sub-frame 2 according to an embodiment of the invention, includes side members 4 and 6, which are provided in a longitudinal direction of the vehicle frame and at a predetermined distance from each other in a direction along the width of the vehicle. A cross member 8 extends in a direction along the width of the vehicle and is connected to end areas of the side members 4 and 6 closest to a front of the vehicle. The direction toward the front of the vehicle is indicated in FIG. 1.

A rearward area of the sub-frame 2 is connected to a main cross member (not shown) of the vehicle frame. The sub-frame 2 may be fixedly mounted to the main cross member, or this connection may be realized using bushings such that some degree of elasticity is provided between the sub-frame 2 and the main cross member.

Lower control arms 12 and 14 of the suspension system are mounted to outer longitudinal sides of the side members 4 and 6, respectively, through front connectors 16 and 18, respectively, and rear connectors 20 and 22, respectively. That is, the front connector 16 of the lower control arm 12 and the front connector 18 of the lower control arm 14 are connected to the side members 4 and 6, respectively, through horizontal rubber bushings. Also, the rear connector 20 of the lower control arm 12 and the rear connector 22 of the lower control arm 14 are connected to the side members 4 and 6, respectively, by interposing vertical rubber bushings therebetween. Positions of the horizontal bushings and vertical bushings are not restricted to the description above and as shown in the drawings, and may be otherwise positioned.

Figure 3:
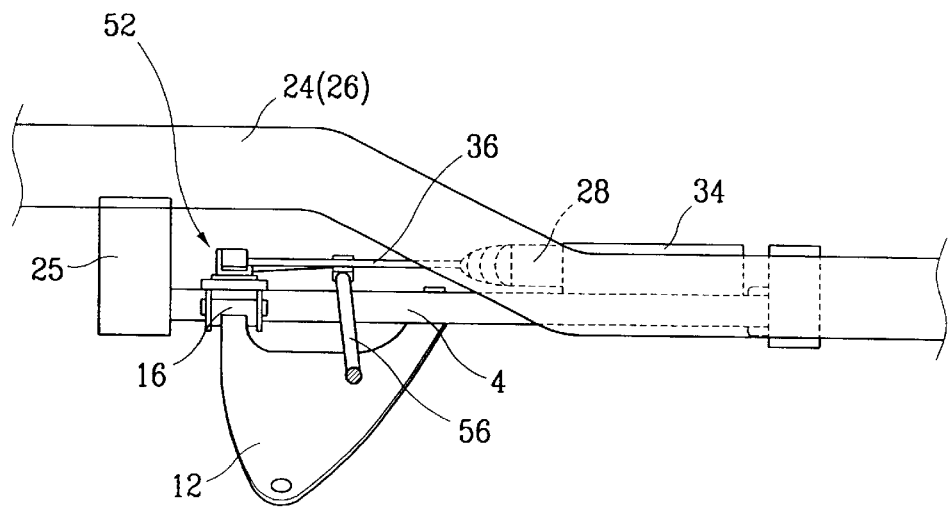
FIG. 3 is a partial side view of the suspension layout of FIG. 1 as viewed in direction A of FIGS. 1 and 2.

Brackets 25 and 27 of a predetermined height are mounted to front ends of the side members 4 and 6, and main side members 24 and 26 are mounted on the brackets 25 and 27, respectively (see FIG. 3). The main side members 24 and 26 are also connected to the main cross member.

Figure 4:
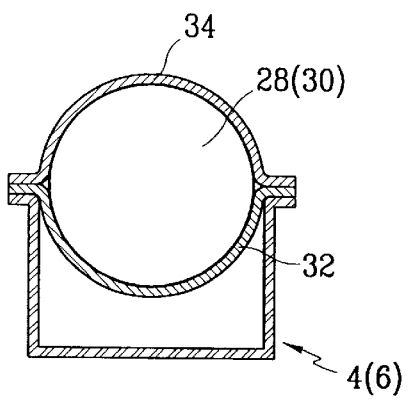
FIG. 4 is a sectional view taken along line II—II of FIG. 2, illustrating a first configuration with respect to a mounting of a steering motor.

Further, with the sub-frame 2 of the above configuration, steering gear motors 28 and 30 are mounted to upper rear portions of the side members 4 and 6, respectively. The steering gear motors 28 and 30 may be formed integrally with side members 4 and 6, respectively, as shown, or separately made and secured thereto. With reference to FIG. 4, upper members 32 are formed in a curved or semicircular cross-section, and the steering gear motors 28 and 30 are placed on (partially within) the upper members 32. Upper covers 34 are then placed over the steering gear motors 28 and 30 to secure the steering gear motors 28 and 30.

The steering gear motors 28 and 30 operate electrically such that rods 36 and 38, slidably provided in the steering gear motors 28 and 30, respectively, undergo rectilinear motion. Since the steering gear motors 28 and 30 are the same as conventional steering gear motors in structure and operation, a detailed description thereof is not provided.

Figure 5:
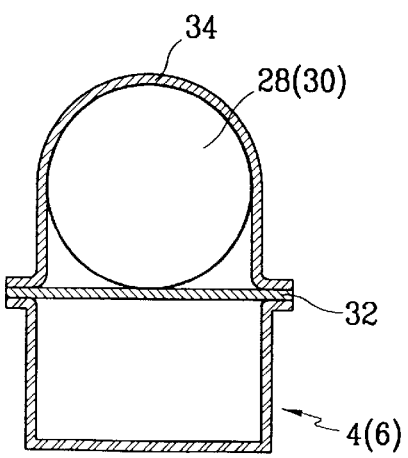
FIG. 5 is a sectional view taken along line II—II of FIG. 2, illustrating a second configuration with respect to a mounting of a steering motor.

As another example, with reference to FIG. 5, the upper members 32 may be formed as flat plates with the steering gear motors 28 and 30 placed on the upper members 32. The upper covers 34, or other such structures that enable integral connection with the side members 4 and 6, may be placed over the steering gear motors 28 and 30 to secure the same.

Figure 2:
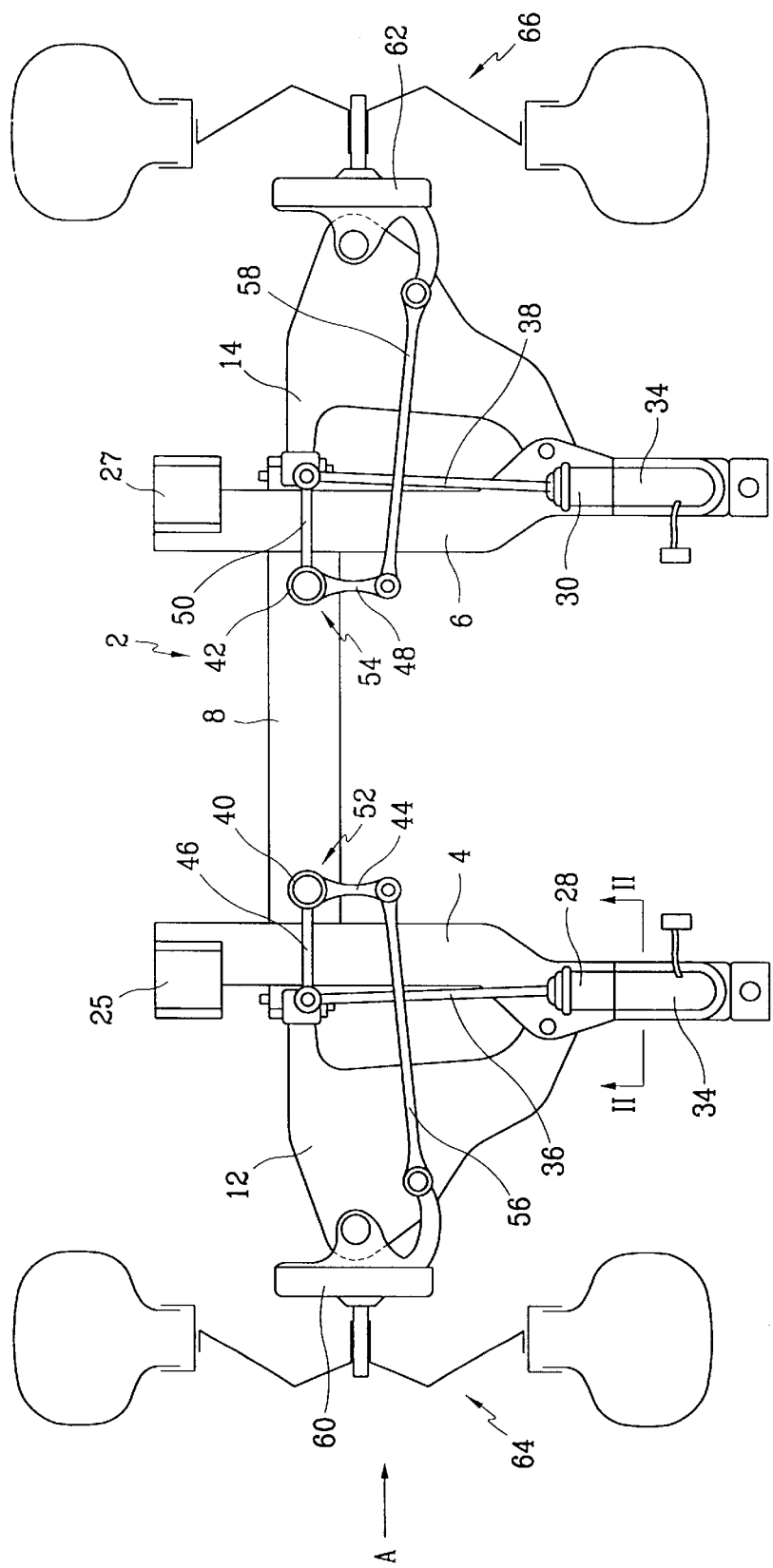
FIG. 2 is a plan view of the suspension layout of FIG. 1.

The rods 36 and 38 of the steering gear motors 28 and 30 are connected to knuckles 60 and 62 (see FIG. 2), respectively, through a power steering transmitting assembly. Links 44 and 46 of predetermined lengths, provided substantially perpendicular to each other, are interconnected at a hinge 40 to form a rotating member 52. Also, links 48 and 50, of predetermined length and provided substantially perpendicular to each other, are interconnected at a hinge 42 to form a rotating member 54. Distal ends of the rods 36 and 38 are hingedly connected to distal ends of the links 46 and 50, respectively.

The hinges 40 and 42 of the rotating members 52 and 54, respectively, are hingedly connected to an upper surface of the cross member 8 on opposite sides thereof. Also, tie rods 56 and 58 are connected respectively to distal ends of the links 44 and 48. The tie rods 56 and 58 are connected to the knuckles 60 and 62. Although the rotating members 52 and 54 are mounted substantially equidistant from the longitudinal center of the cross member 8, and are configured to rotate in opposite directions, the rotating members 52 and 54 are not limited in these respects and may be mounted to various locations of the cross member 8 and undergo rotation in the same direction.

Figure 6:
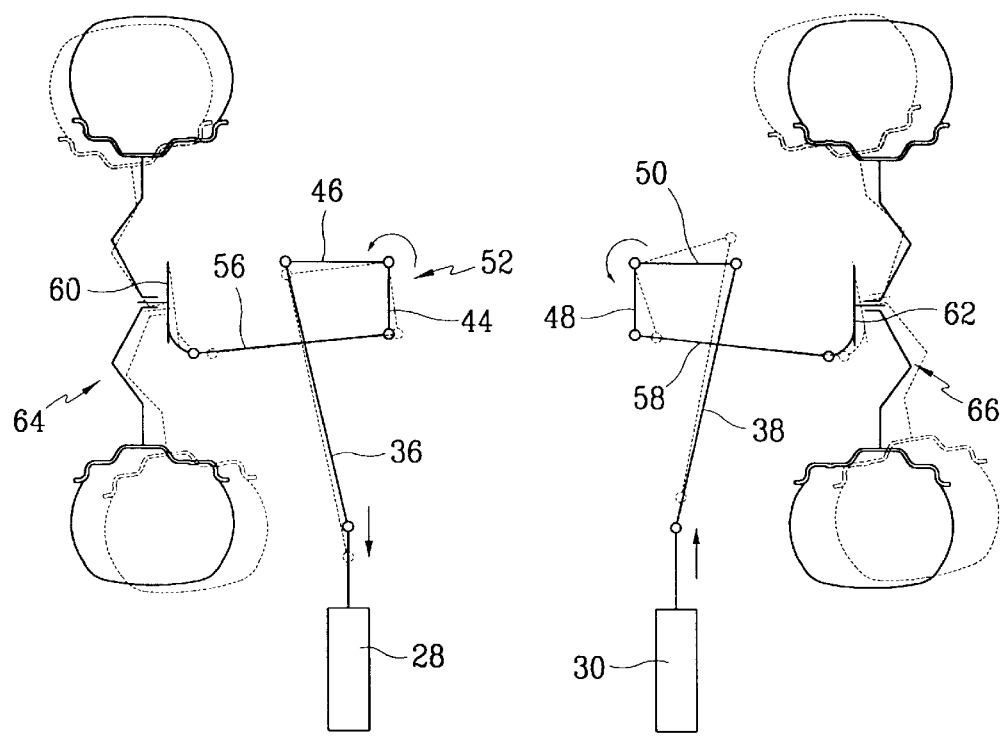
FIG. 6 is a schematic view showing an operational state of a steering system applying a steering gear frame according to a preferred embodiment of the present invention.

With the invention as described above, when it is desired to turn left, for example, the driver rotates a steering wheel to the left. This is sensed by a control unit, which then performs control of the steering gear motors 28 and 30. That is, since the wheels 64 and 66 must pivot about their vertical central axes in the same direction, the control unit performs control such that the rods 36 and 38 of the steering gear motors 28 and 30, are moved in opposite directions as shown in FIG. 6. Hence, independent steering is realized.

In the suspension layout of a preferred embodiment of the present invention, since the steering apparatus assembly and the sub-frame are combined in one structure, the overall strength of the suspension layout is enhanced, and the time required for assembly is decreased to thereby improve productivity and decrease manufacturing costs.

Further, since the steering gear motors are positioned under the vehicle frame, forced entrance of the steering gear motors into the passenger compartment is prevented during collisions, thereby enhancing safety.

In addition, with the omission of the prior art steering apparatus that extends for a considerable length along the direction of the width of the vehicle, the cross member may be more freely designed, the overall free layout design is improved, and the available space in the engine compartment is increased with the decrease in the amount of space that is utilized. Also, this enables the path through which a propeller shaft passes in a 4WD vehicle to be optimized.

Finally, since the positioning of the tie rods may be more freely determined, more options are presented with respect to the design of the suspension system, and independent steering is also made possible such that optimal steering angles are realized and tire traction is improved.

Although preferred embodiments of the present invention have been described in detail hereinabove, it should be clearly understood that many variations and/or modifications of the basic inventive concepts herein taught which may appear to those skilled in the present art will still fall within the spirit and scope of the present invention, as defined in the appended claims.

What is claimed is:

1. A suspension layout for a vehicle adapted to be utilized with a vehicle frame having longitudinal and width dimensions, comprising:

a sub-frame including a plurality of side members extending along the longitudinal direction and spaced apart at a predetermined distance from each other in the width direction, and a cross member extending along the width direction of the vehicle and fixedly connected to the side members; and a steering apparatus assembly including a steering gear motor disposed on each side member, said motors actuating rods for rectilinear motion, and a steering transmitting assembly converting the rectilinear motion of the rods to rotational motion of associated knuckles.

2. The steering layout of claim 1, wherein the side members are fixed to main side members of the vehicle frame in a front portion of the side members.

3. The steering layout of claim 1, wherein a front outer area of each side member of the sub-frame is fixed to a main side member of the vehicle frame.

4. The steering layout of claim 1, wherein:

indented portions are formed in the side members; and the steering gear motors are disposed in the indented portions to the side members.

5. The steering layout of claim 4, wherein:

the steering gear motors of the steering apparatus assembly are mounted along a longitudinal direction to the side members of the sub-frame;

the indented portions are formed in upper surfaces of the side members; and the steering gear motors are fixed to the side members by upper covers.

6. The steering layout of claim 1, wherein the steering transmitting assembly comprises tie rods connected to left and right knuckles, and a plurality of rotating members each including a first link and a second link, the first links being hingedly connected to the rods of the steering gear motors, and the second links being connected to the tie rods.

7. The steering layout of claim 6, wherein the rotating members are symmetrically provided about an imaginary center of the cross member in the longitudinal direction.

8. A vehicle suspension layout, comprising:

first and second side frame members;

a cross member extending between and rigidly securing together said side frame members, said side members and cross member together forming at least a part of a sub-frame;

first and second steering gear motors, one each disposed on one side member in a lengthwise direction thereof; and first and second steering assemblies disposed on said sub-frame, one each cooperating with one steering gear motor to transmit steering forces independently to knuckles associated with vehicle wheels.

9. The vehicle suspension layout of claim 8, wherein said steering gear motors are disposed in indentations formed in said side members.

10. The vehicle suspension layout of claim 9, wherein:

said steering assemblies comprise a link element hingedly connected to a tie rod, the link element being pivotably mounted on the cross member; and the link member is hingedly connected to a rod of the steering gear opposite the tie rod, and the tie rod is configured for connection to the knuckle opposite the link member.

* * * * *